United States Patent [19]

Matz et al.

[11] Patent Number: 5,132,832
[45] Date of Patent: Jul. 21, 1992

[54] TOKEN RING CONCENTRATOR WITH GLOBAL RESET CAPABILITY

[75] Inventors: Bret A. Matz, Harrisburg, Pa.; K. C. Babu; Geeta George, both of Kerala, India; Hemant K. R. Kumar, Bangalore, India; Soma Rakshit, Bangalore, India; S. Krishnakumar Rao, Bangalore, India

[73] Assignee: AMP Incorporated, Harrisburg, Pa.

[21] Appl. No.: 628,886

[22] Filed: Dec. 18, 1990

[51] Int. Cl.⁵ .................. H04J 14/08; H04B 10/20
[52] U.S. Cl. .................... 359/137; 359/118; 370/85.5
[58] Field of Search .......... 359/161, 137, 118; 370/85.4, 85.5, 94.1, 94.2, 16.1; 340/825.05

[56] References Cited

U.S. PATENT DOCUMENTS

| | | | |
|---|---|---|---|
| 3,638,075 | 1/1972 | Brown | 317/148.5 R |
| 4,190,821 | 2/1980 | Woodward | 340/147 SC |
| 4,514,841 | 4/1985 | Sem-Sandberg | 370/55 |
| 4,527,216 | 7/1985 | Stammely | 361/156 |
| 4,697,047 | 9/1987 | Hirai et al. | 178/2 C |
| 4,701,630 | 10/1987 | Annunziati et al. | 307/112 |
| 4,709,365 | 10/1987 | Beale et al. | 371/11 |
| 4,763,315 | 8/1988 | Nakayashiki et al. | 370/16 |
| 4,803,485 | 2/1989 | Rypinski | 340/825.05 |
| 4,847,611 | 7/1989 | Bekki et al. | 340/825.05 |
| 4,862,158 | 8/1989 | Keller et al. | 340/825.05 |
| 4,974,190 | 11/1990 | Curtis | 340/825.5 |

OTHER PUBLICATIONS

Reissue Patent No. 31,852 dated Mar. 19, 1985 by Soderblom.

Primary Examiner—Edward L. Coles, Sr.
Assistant Examiner—Rafael Baiares

[57] ABSTRACT

A concentrator for a token ring network utilizes latching relays having separate set and reset coils for controlling the insertion/bypass of the ports into the token ring network. Circuitry for providing a global reset capability for all of the ports includes transistors which function to both provide a path for the global reset pulse to the reset coils and to isolate each reset coil in a port from the reset coils of the other ports. Other circuitry is provided for preventing activation of the global reset function from affecting an active port.

12 Claims, 2 Drawing Sheets

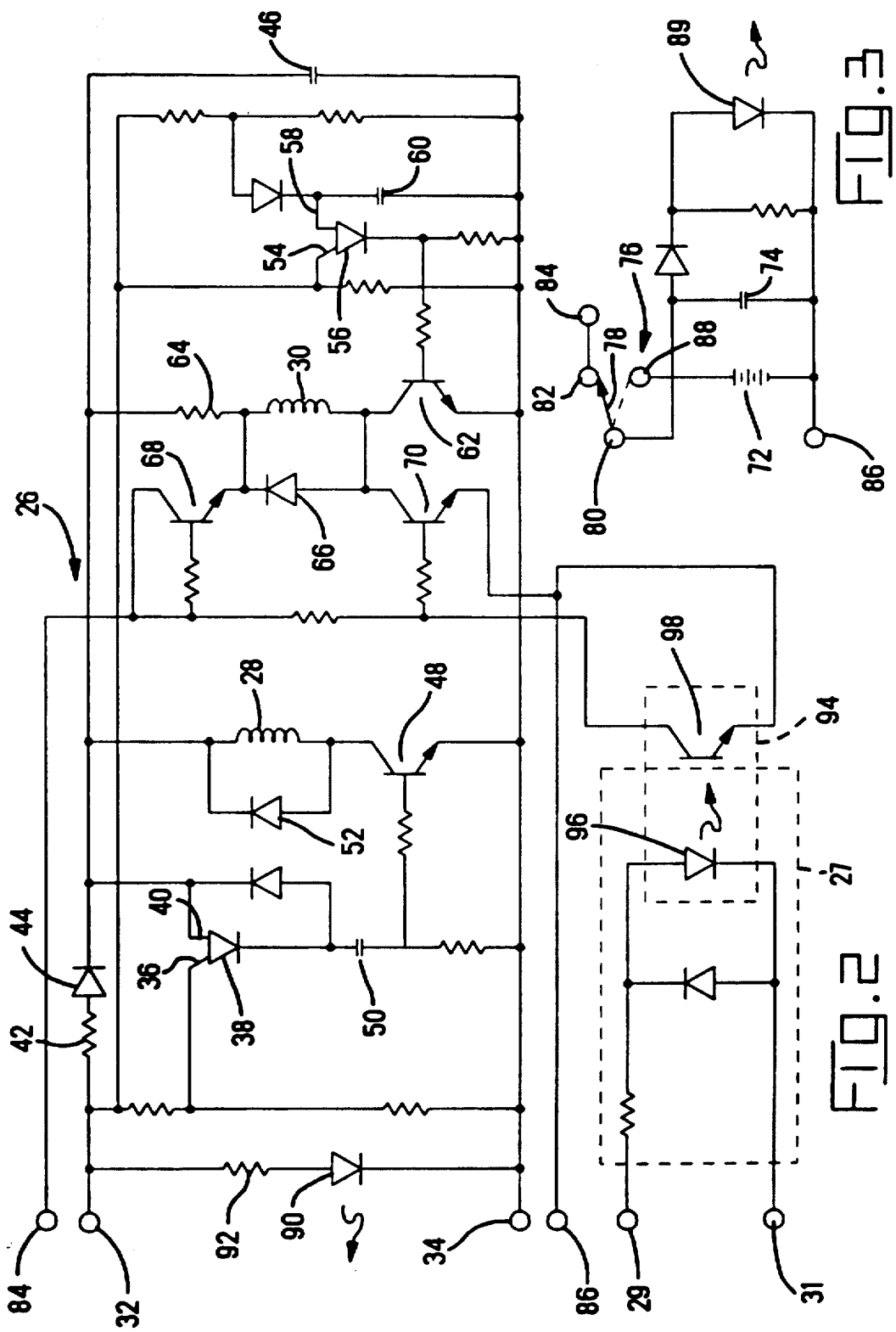

TOKEN RING CONCENTRATOR WITH GLOBAL RESET CAPABILITY

BACKGROUND OF THE INVENTION

This invention relates to computer communications networks operating in accordance with a token ring access protocol and, more particularly, to a token ring concentrator for use in such networks.

Token ring networks are well defined and standardized networks by which computers connected to the network may communicate with each other. A token ring network includes a trunk which comprises a normally closed ring and includes a token ring concentrator having a number of input/output ports through which, by means of relay switching, computers may be inserted into the network. A standard governing token ring networks is the IEEE Standard 802.5, wherein each of the input/output ports is referred to as a trunk coupling unit. According to this standard, insertion of a computer into the ring is controlled by the computer itself, with the mechanism for effecting the insertion or bypass of the computer residing in its respective input/output port of the concentrator. Each computer is connected to a respective input/output port of the concentrator via a medium interface cable (MIC) and the computer exercises control of the insertion/bypass mechanism via the MIC using a phantom circuit technique. The phantom circuit impresses a DC voltage on the MIC. This DC voltage is transparent to the passage of computer-transmitted symbols, hence the name "phantom". The impressed voltage is used within the input/output port of the concentrator to effect the transfer of a switching action to cause the serial insertion of the computer in the ring. Cessation of the phantom drive causes a switching action which will bypass the computer and cause the computer to be put into a looped (wrapped) state. This loop may be used by the computer for off-line self-testing functions.

The IEEE Standard 802.5 illustrates relay contacts for effecting the switching action to bypass/insert the computer. Typically, a latching relay is used because the impressed phantom voltage, and the resulting phantom current, is not sufficient to continuously power a relay. Instead, a capacitor is usually provided to store energy, and at the appropriate time the capacitor is discharged through the relay coil to provide the burst of energy required to switch the relay.

In a system of the type described, a typical latching relay includes a set coil and a reset coil, with the set coil being energized to effect insertion of the computer into the ring and the reset coil being energized to effect bypass of the computer from the ring. It is often desired to provide a global reset capability which results in simultaneously bypassing all of the computers coupled to the input/output ports of a concentrator. This requires that all of the reset coils be energized simultaneously. It is therefore an object of the present invention to provide a global reset arrangement allowing for the simultaneous energization of all of the reset coils in a token ring concentrator.

If the reset coils are used by the insertion/bypass control mechanisms in the input/output ports as well as by the global reset arrangement, some means must be provided for isolating the reset coils from each other while still coupling all of the reset coils to the global reset arrangement. Accordingly, it is a further object of this invention to provide an arrangement which effects such isolation. If a port is reset while in use, this can create an undesirable condition for the computer connected to that port. It is therefore another object of this invention to provide an arrangement which prevents activation of the global reset function from affecting an input/output port that is active.

SUMMARY OF THE INVENTION

The foregoing and additional objects are attained in accordance with the principles of this invention by providing a token ring concentrator for a computer communications network operating in accordance with a token ring access protocol, the concentrator comprising, a plurality of ports each for connection to an input/output port of a respective computer having a token ring adaptor, each of the concentrator ports having switching means for selectively inserting the respective computer into the network or isolating the respective computer from the network, the switching means including a latching relay having a set coil and a reset coil, the switching means being so arranged that energization of the set coil effects insertion of the respective computer into the network and energization of the reset coil effects isolation of the respective computer from the network, and control means for controlling the selective energizations of the set coil and the reset coil, the control means being responsive to a phantom voltage supplied by the respective computer when it is connected to the concentrator port for energizing the set coil and responsive to the absence of the phantom voltage for energizing the reset coil, and global reset means coupled to all of the concentrator ports for selectively energizing all the reset coils, the global reset means including a switch, current pulse generating means responsive to operator manipulation of the switch for generating a current pulse, means for coupling the current pulse generating means to the reset coils of all of the concentrator ports, and means for providing isolation between the reset coils of the concentrator ports.

In accordance with an aspect of this invention, the coupling means of the global reset means includes a pair of leads extending from the current pulse generating means and the isolation providing means includes in each of the concentrator ports a first transistor connected between a first of the leads and a first end of the respective reset coil and a second transistor connected between the second of the leads and the second end of the respective reset coil.

In accordance with another aspect of this invention, each of the concentrator ports further includes reset disabling means responsive to the presence of the phantom voltage at that port for providing a path for said current pulse that bypasses the reset coil of that port.

BRIEF DESCRIPTION OF THE DRAWINGS

The foregoing will be more readily apparent upon reading the following description in conjunction with the drawings wherein:

FIG. 2 is a detailed schematic circuit diagram of a bypass control circuit constructed in accordance with the principles of this invention; and FIG. 3 is a schematic circuit diagram of global reset circuitry which may be coupled to the circuitry shown in FIG. 2.

DETAILED DESCRIPTION

Figure 1:
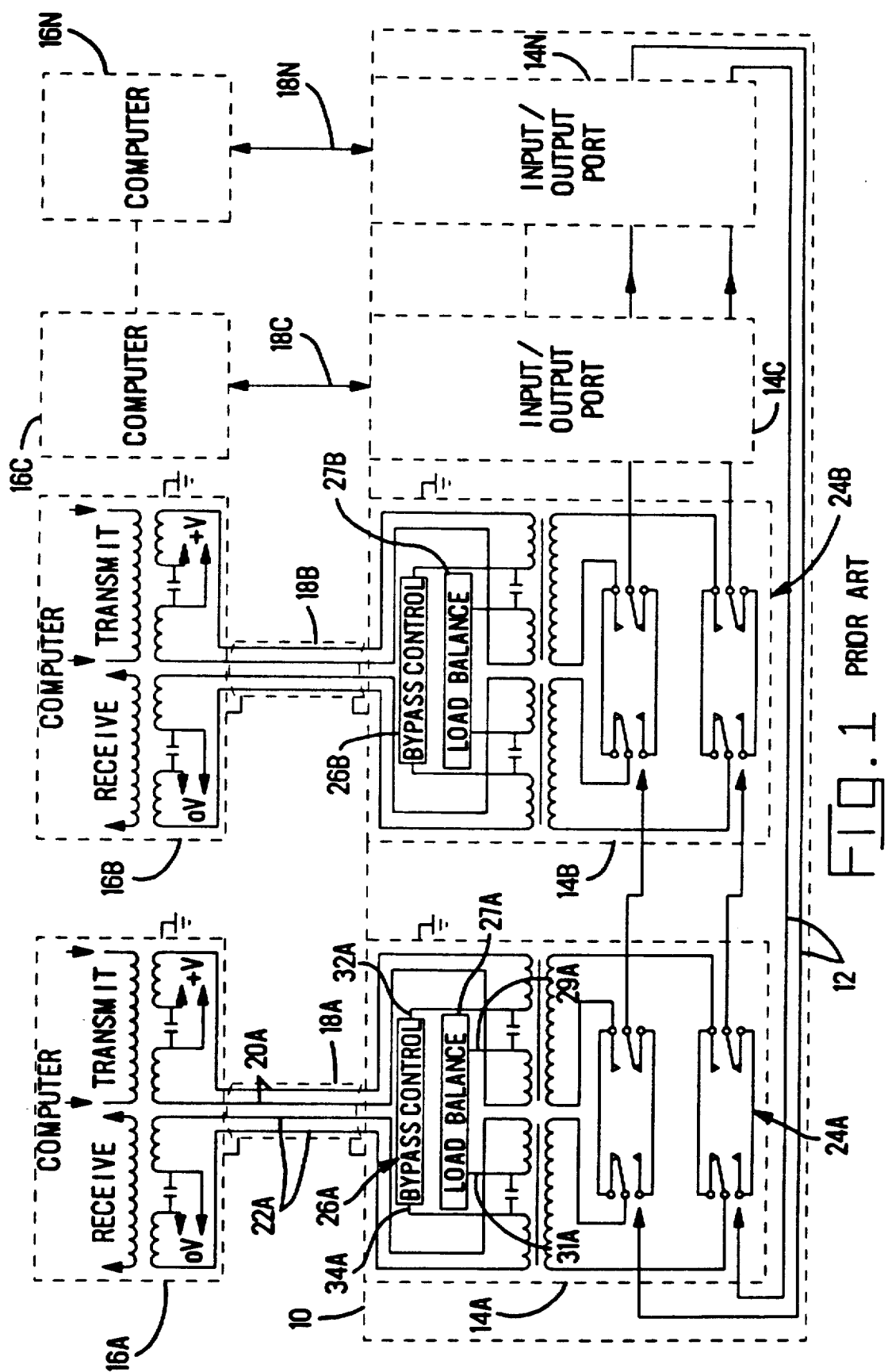
FIG. 1 is a block diagram of a token ring network having a token ring concentrator including a plurality of trunk coupling units according to the standards set forth in IEEE Standard 802.5.

FIG. 1 shows a token ring concentrator including a plurality of trunk coupling units according to IEEE Standard 802.5. The concentrator 10 includes a looped or endless two wire communications channel, or ring, 12 (also referred to as a trunk) which passes through a plurality of trunk coupling units, or ports, 14a, 14b, . . ., 14n. These ports are each connected to a respective input/output port of a computer 16a, 16b, . . ., 16n by a medium interface cable 18a, 18b, . . ., 18n. In accordance with the IEEE Standard 802.5, each of the computers 16a, 16b, . . ., 16n includes a token ring adaptor which has separate receive and transmit transformers Each transformer has two coils which are DC isolated but AC signal coupled to each other so that there is a transmit pair of conductors 20 and a receive pair of conductors 22. These conductors have impressed on them a phantom voltage so that the transmit pair of conductors 20 have a voltage of +V volts DC and the receive pair of conductors 22 have a voltage of 0 volts DC.

Within each of the ports 14 of the concentrator 10 is a switching mechanism 24 comprising a plurality of relay contacts which are utilized to selectively insert the respective computer 16 into the token ring network or bypass (isolate) the respective computer from the token ring network. Control of the switching action is effected through the bypass control circuit 26 within each of the ports 14. The bypass control circuit 26 includes a latching relay whose contacts make up the switching mechanism 24, and responds to the presence or absence of the phantom voltage impressed on the medium interface cable 18 by the respective computer 16 for inserting or bypassing, respectively, the respective computer 16.

Each of the ports 14 also includes a load balance circuit 27. According to the IEEE Standard 802.5, the static load provided between the leads 32 and 29 and the leads 34 and 31 shall have a resistance between 2.9 kilohms and 5.3 kilohms and shall be matched within 5%. The load between the leads 32 and 34 is produced by the bypass control circuit 26 and the load between the leads 29 and 31 is produced by the load balance circuit 27, which must compensate for any non-linearity of the load produced by the bypass control circuit 26.

FIG. 2 shows a bypass control circuit 26 constructed in accordance with the principles of this invention. The bypass control circuit 26 includes the coils of a latching relay whose contacts make up the switching mechanism 24. This latching relay includes a set coil 28 and a reset coil 30. When the set coil 28 is energized, the switching mechanism 24 functions to insert the respective computer 16 into the token ring network. When the reset coil 30 is energized, the switching mechanism 24 functions to isolate the respective computer 16 from the token ring network. The terminal 32 of the bypass control circuit 26 is connected to receive the phantom positive voltage applied by the respective computer 16 to the transmit pair 20 of the medium interface cable 18 and the terminal 34 of the bypass control circuit 26 is connected to receive the phantom zero volts applied by the respective computer 16 to the receive pair 22 of the medium interface cable 18.

When the phantom voltage is initially applied across the terminals 32 and 34 due to the connection of the respective computer 16 to the port 14 via the medium interface cable 18, the gate 36 of the programmable unijunction transistor 38 is at a higher voltage than the anode 40, so the transistor 38 does not conduct. At this time, the flow of current through the resistor 42 and the diode 44 due to the phantom voltage charges the capacitor 46. When the capacitor 46 is charged to a voltage equal to the voltage at the gate 36 plus the offset voltage of the transistor 38, the transistor 38 is caused to conduct. This provides a forward bias for the transistor 48. Conduction of the transistor 48 allows the capacitor 46 to discharge through the set coil 28 of the latching relay, causing the respective computer 16 to be inserted into the token ring network. The transistor 38 stops conducting when the capacitor 50 becomes fully charged, thus terminating the current flow through the coil 28. The capacitor 46 then recharges. The diode 52 is provided for protection against back EMF in the set coil 28.

Whenever the phantom voltage is present across the terminals 32 and 34 due to the connection of the medium interface cable 18 to the port 14, the gate 54 of the programmable unijunction transistor 56 is at a higher voltage than the anode 58. However, if the medium interface cable 18 is disconnected from the port 14 or if the computer 16 removes the phantom voltage, the voltage on the gate 54 goes below the voltage at the anode 58 to cause the transistor 56 to become conductive. This allows the capacitor 60 to discharge through the transistor 56 and forward bias the transistor 62. Conduction of the transistor 62 allows the capacitors 46 and 50 to discharge through the reset coil 30 of the latching relay. Energization of the reset coil 30 causes the switching mechanism 24 to bypass, or isolate, the port 14 from the token ring network. The resistor 64 is provided to limit the voltage across the reset coil 30 and the diode 66 provides protection against back EMF in the reset coil 30.

In accordance with the principles of this invention, the transistor 68 and the transistor 70 provide a path for the global reset current pulse which energizes the reset coil 30. The transistors 68 and 70 also function to provide signal isolation between all of the ports 14 of the concentrator 10, since the reset coils of the latching relays of all of the ports 14 are connected in parallel to effect the global reset function. A circuit for generating the global reset current pulse is shown in FIG. 3. This circuit includes the battery 72, preferably a three volt lithium battery for long life, the capacitor 74 and the switch 76. The switch 76 is a momentary contact type switch wherein the armature 78 normally connects the terminals 80 and 82, thereby connecting the capacitor 74 to the reset terminals 84 and 86. The reset terminals 84 and 86 are connected to all of the ports 14 of the concentrator 10. Normally, the capacitor 74 has no charge thereon, so there is no circuit operation, with the transistors 68 and 72 providing isolation between the ports 14. However, when the armature 78 of the switch 76 is moved to the position shown by the broken line so that the switch terminals 80 and 88 are connected, the capacitor 74 is charged by the battery 72. Upon release of the armature 78 by the operator to the original position shown by the solid line, the charged capacitor 74 is connected across the terminals 84 and 86. The capacitor 74 then forward biases the transistors 68 and 70, and discharges through the reset coils 30 of all of the ports 14. This results in all of the ports 14 being isolated from the token ring network, and allows for their subsequent insertion whenever phantom voltage is present. The light emitting diode 89 provides a visual indication when the capacitor 74 is charged sufficiently to guarantee a global reset.

The light emitting diode 90 and the resistor 92 provide an indication of the status of the respective port 14, the light emitting diode 90 being energized whenever the phantom voltage is present across the terminals 32 and 34. The light emitting diode 90 in the bypass control circuit 26 introduces a non-linearity that causes the effective resistance between the terminals 32 and 34 to change as the voltage changes (the IEEE Standard 802.5 allows a phantom voltage in the range from 3.5 volts to 7.0 volts). As a result, using a resistor as the load balance 27 will not meet the requirements of the IEEE Standard 802.5 since its resistance would not change with the change in voltage. In order to meet the 5% matching requirement, an opto-isolator circuit 94 is provided across the terminals 29 and 31. The light emitting diode 96 of the opto-isolator 94 provides the same equivalent voltage drop as the light emitting diode 90, thereby satisfying the load balancing requirement.

According to this invention, the opto-isolator 94 is also utilized to provide global reset protection for active ports so that accidental operation of the switch 76 (FIG. 3) will not reset ports which are in use. Thus, the phototransistor 98 of the opto-isolator 94 is coupled to short circuit the transistor 70 when phantom voltage is present, thereby preventing the transistor 70 from becoming conductive when a global reset current pulse is applied to the terminals 84, 86. The transistor 98, when conductive, provides a path for that current pulse, which path bypasses the reset coil 30.

Accordingly, there has been disclosed an improved token ring concentrator with global reset capability for use in a token ring network. While an illustrative embodiment of the present invention has been disclosed herein, it will be apparent to those of ordinary skill in the art that various modifications and adaptations to that embodiment are possible and it is only intended that the present invention be limited by the scope of the appended claims.

We claim:

1. A token ring concentrator for a computer communications network operating in accordance with a token ring access protocol, the concentrator comprising:
   a) a plurality of ports each for connection to an input/output port of a respective computer having a token ring adaptor, each of said concentrator ports having:
      1) switching means for selectively inserting the respective computer into the network or isolating the respective computer from the network, the switching means including a latching relay having a set coil and a reset coil, the switching means being so arranged that energization of said set coil effects insertion of the respective computer into the network and energization of said reset coil effects isolation of the respective computer from the network; and
      2) control means for controlling the selective energizations of said set coil and said reset coil, said control means being responsive to a phantom voltage supplied by the respective computer when it is connected to said concentrator port for energizing said set coil and responsive to the absence of said phantom voltage for energizing said reset coil; and
   b) global reset means coupled to all of said concentrator ports for selectively energizing all said reset coils, said global reset means including a switch, current pulse generating means responsive to operator manipulation of said switch for generating a current pulse, means for coupling said current pulse generating means to the reset coils of all of said concentrator ports, and means for providing isolation between the reset coils of the concentrator ports.

2. The concentrator according to claim 1 wherein:
   said coupling means of said global reset means includes a pair of leads extending from said current pulse generating means; and
   said isolation providing means includes in each of said concentrator ports a first transistor connected between a first of said leads and a first end of the respective reset coil and a second transistor connected between the second of said leads and the second end of the respective reset coil.

3. The concentrator according to claim 2 wherein:
   said switch includes an operator manipulatable armature and three terminals, said armature normally connecting a first of said terminals to a second of said terminals and responsive to operator manipulation thereof for connecting the first of said terminals to the third of said terminals, said second switch terminal being connected to said first lead; and
   said current pulse generating means includes a capacitor connected between said first switch terminal and said second lead and a battery connected between said third switch terminal and said second lead.

4. The concentrator according to claim 1 wherein said control means includes:
   a capacitor coupled to be charged when said phantom voltage is supplied;
   means responsive to the charge on said capacitor reaching a predetermined threshold for discharging said capacitor through said set coil and thereafter recharging said capacitor; and
   means responsive to cessation of said phantom voltage for discharging said capacitor through said reset coil.

5. The concentrator according to claim wherein each of said concentrator ports further includes reset disabling means responsive to the presence of said phantom voltage at that port for providing a path for said current pulse that bypasses said reset coil.

6. The concentrator according to claim 5 wherein:
   said coupling means of said global reset means includes a pair of leads extending from said current pulse generating means;
   said isolation providing means includes in each of said concentrator ports a first transistor connected between a first of said leads and a first end of the respective reset coil and a second transistor connected between the second of said leads and the second end of the respective reset coil; and
   said reset disabling means includes means coupled to said second transistor and operative in response to the presence of said phantom voltage for providing a path for said current pulse which bypasses said second transistor.

7. The concentrator according to claim 6 wherein said path providing means of said reset disabling means includes an opto-isolator having a light emitting diode coupled to receive the phantom voltage and a light sensitive transistor coupled to said second transistor and so arranged that when conductive said light sensitive transistor provides a path for said current pulse which prevents said second transistor from conducting, thereby bypassing said current pulse from said reset coil.

8. The concentrator according to claim 7 wherein each of said concentrator ports further includes an indicator light emitting diode connected to be energized when said phantom voltage is present at that port and said opto-isolator light emitting diode balances the load produced by said indicator light emitting diode.

9. The concentrator according to claim 3 wherein said global reset means includes indicating means for providing an indication when said capacitor is sufficiently charged that said current pulse is adequate to fully energize all the reset coils of said concentrator.

10. The concentrator according to claim 1 wherein each of said concentrator ports further includes:
   an indicator light emitting diode connected to be energized when said phantom voltage is present at that port; and
   a balance diode coupled to receive said phantom voltage and balance the load produced by said indicator light emitting diode.

11. The concentrator according to claim 10 wherein:
   said coupling means of said global reset means includes a pair of leads extending from said current pulse generating means; and
   said isolation providing means includes in each of said concentrator ports a first transistor connected between a first of said leads and a first end of the respective reset coil and a second transistor connected between the second of said leads and the second end of the respective reset coil; and further including:
   reset disabling means including said balance diode and means coupled to said second transistor and operative in response to the presence of said phantom voltage at said balance diode for providing a path for said current pulse which bypasses said second transistor.

12. The concentrator according to claim 11 wherein said reset disabling means includes an opto-isolator having a light emitting diode coupled to receive the phantom voltage and a light sensitive transistor coupled to said second transistor and so arranged that when conductive said light sensitive transistor provides a path for said current pulse which prevents said second transistor from conducting, thereby bypassing said current pulse from said reset coil, said light emitting diode of said opto-isolator functioning as said balance diode and said light sensitive transistor functioning as said path providing means.

* * * * *

UNITED STATES PATENT AND TRADEMARK OFFICE
CERTIFICATE OF CORRECTION

PATENT NO. : 5,132,832
DATED : July 21, 1992
INVENTOR(S) : Bret A. Matz, et al

It is certified that error appears in the above-indentified patent and that said Letters Patent is hereby corrected as shown below:

Col. 6, claim 5, line 1, insert --1-- between "claim" and "wherein".

Signed and Sealed this

Fourteenth Day of September, 1993

Attest:

BRUCE LEHMAN

*Attesting Officer*   *Commissioner of Patents and Trademarks*

REEXAMINATION CERTIFICATE (2545th)
United States Patent [19]

Matz et al.

[11] B1 5,132,832

[45] Certificate Issued  Apr. 18, 1995

[54] TOKEN RING CONCENTRATION WITH GLOBAL RESET CAPABILITY

[75] Inventors: Bret A. Matz, Harrisburg, Pa.; K. C. Babu; Geeta George, both of Kerala, India; Hemant K. R. Kumar, Bangalore, India; Soma Rakshit, Bangalore, India; S. Krishnakumar Rao, Bangalore, India

[73] Assignee: AMP Incorporated, Harrisburg, Pa.

Reexamination Request:
No. 90/003,472, Jun. 23, 1994

Reexamination Certificate for:
Patent No.: 5,132,832
Issued: Jul. 21, 1992
Appl. No.: 628,886
Filed: Dec. 18, 1990

Certificate of Correction issued Sep. 14, 1993

[51] Int. Cl.$^6$ .................... H04B 10/20; H04J 14/08
[52] U.S. Cl. .................... 359/137; 359/118; 359/119; 370/85.5; 370/56
[58] Field of Search .................... 359/118, 119, 125, 137, 359/173; 370/56, 67, 85.1, 85.4, 85.5, 16.1, 94.1, 94.2; 340/825.05

[56] References Cited
U.S. PATENT DOCUMENTS 4,905,230  2/1990  Madge et al. .................... 370/85.5
5,034,738  7/1991  Ishihara et al. .................... 340/825.05

FOREIGN PATENT DOCUMENTS

0205968A2  12/1986  European Pat. Off. .
0289189A2  11/1988  European Pat. Off. .

OTHER PUBLICATIONS

A schematic of a Madge TCU circuit.
A schematic of an IBM TCU circuit.
A schematic of an Accton TCU circuit.

*Primary Examiner*—Leo H. Boudreau

[57] ABSTRACT

A concentrator for a token ring network utilizes latching relays having separate set and reset coils for controlling the insertion/bypass of the ports into the token ring network. Circuitry for providing a global reset capability for all of the ports includes transistors which function to both provide a path for the global reset pulse to the reset coils and to isolate each reset coil in a port from the reset coils of the other ports. Other circuitry is provided for preventing activation of the global reset function from affecting an active port.

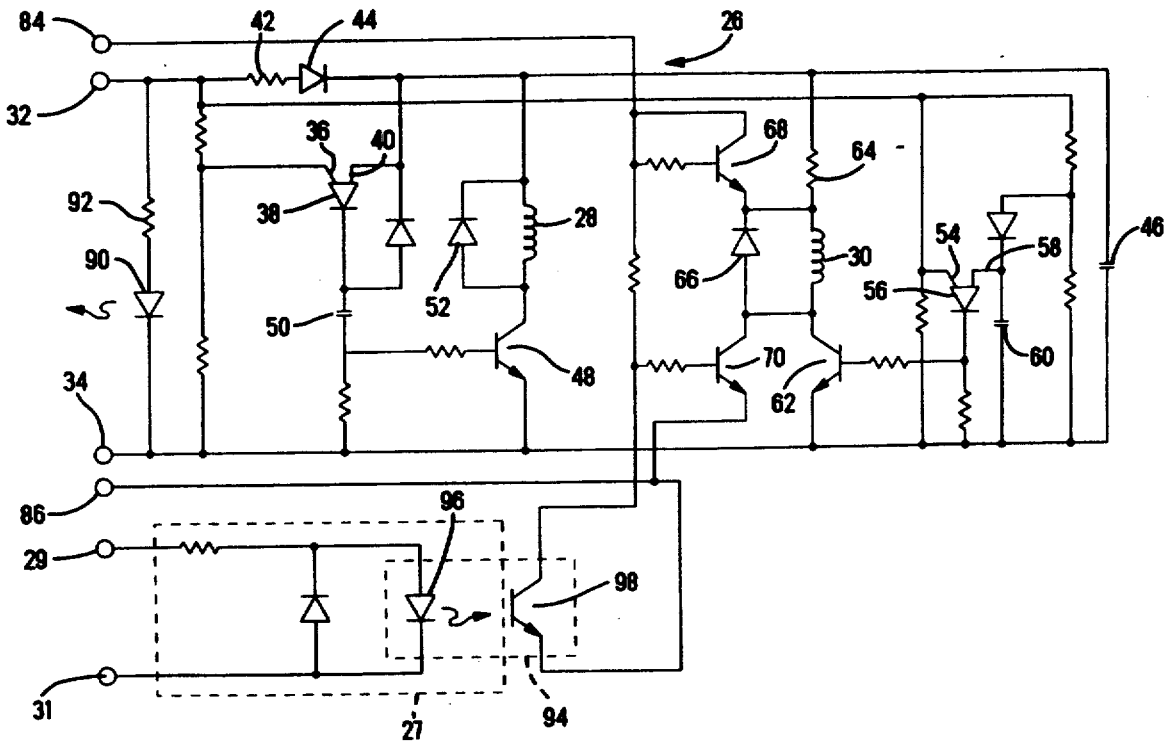

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-12 is confirmed.